Oct. 24, 1972   R. E. BURTON   3,700,590
SEPARATION OF ORGANIC SOLIDS FROM WASTE LIQUIDS
Filed Aug. 31, 1970   3 Sheets-Sheet 1

INVENTOR.
Robert Edward Burton
BY Flehr, Hohbach, Test,
Albritton & Herbert
Attorneys Oct. 24, 1972 R. E. BURTON 3,700,590
SEPARATION OF ORGANIC SOLIDS FROM WASTE LIQUIDS
Filed Aug. 31, 1970 3 Sheets-Sheet 2

INVENTOR.
Robert Edward Burton
BY
Attorneys

INVENTOR.
Robert Edward Burton

United States Patent Office 3,700,590
Patented Oct. 24, 1972

3,700,590
SEPARATION OF ORGANIC SOLIDS FROM
WASTE LIQUIDS
Robert Edward Burton, Willits, Calif., assignor to
Microphor, Inc., Willits, Calif.
Continuation-in-part of abandoned application Ser. No.
842,667, July 17, 1969. This application Aug. 31, 1970,
Ser. No. 68,428
Int. Cl. C02c 1/04
U.S. Cl. 210—17
29 Claims

ABSTRACT OF THE DISCLOSURE

System for treating waste liquids to separate organic solid contaminants and to reduce the biological oxygen demand of the clarified liquids so that they can be freely and safely discharged from the system. Liquid wastes are introduced to the system together with oxygen-containing gas which may be under slight pressure. The system makes use of masses or bundles of bark fiber or other fibrous material containing microbiological communities which thrive upon and consume the organic solid wastes. The liquid waste treating systems are particularly adapted for marine, rail, vehicular or aircraft use in the form of small compact wholly self-contained units.

CROSS-REFERENCE TO RELATED APPLICATION

This application is a continuation-in-part of my earlier filed application Serial No. 842,667, filed July 17, 1969, now abandoned.

BACKGROUND OF INVENTION

This invention generally relates to the treatment of various liquid wastes including raw sewage and similar liquid wastes, and more particularly relates to improved methods and means for carrying out such treatment.

Pats. 3,192,154, 3,238,124 and 3,407,935 disclose methods and means for treating waste water such as sewage and other liquid systems to affect separation and removal of colloidal and other organic solid wastes simultaneously with aeration to reduce the biological oxygen demand of such waste liquids. The treating systems therein disclosed make use of natural bark fibers, for example, redwood and similar bark fibers, which contain and support micro-biological communities capable of separating and removing unwanted organic solid wastes from the liquid systems. The disclosed treating systems also make use of various types of aeration means, for example aerial sprays, trickling filters and hanging fiber sections, together with the forced circulation of the waste liquids through the same. Various devices for continuously circulating the waste liquids for purposes of clarification and aeration are disclosed.

SUMMARY OF INVENTION AND OBJECTS

In general, the present invention is directed to improvements upon waste liquid treating systems of the type described, particularly with respect to a method and means adapted to use within the confines of relatively compact, self-contained units, such as might be incorporated within the structure of boats, aircraft, rail cars, busses and the like, without requirement of pumps, extensive circulatory lines or other components of forced circulatory systems. It is further directed to systems of such character capable of performing effectively under conditions of frequent or infrequent or occasional use.

Broadly stated, the waste liquid treating systems of the present invention depend upon the substantially continuous introduction of an oxygen-containing gas to a closed circulatory system wherein micro-biological communities are maintained within the confines of natural bark fibers or other generally fibrous material forming part of the closed circulatory system. In a preferred embodiment, masses or bundles of elongate substantially individualized bark fibers, particularly redwood bark fibers, are positioned within one or more chambers through which both the oxygen-containing gas and waste liquids must pass. Natural bark fibers have been found to be particularly effective in supporting the life of micro-biological communities contained therein, which thrive therein and consume the organic solids (gross or colloidal) present in the waste liquids undergoing treatment. As hereinafter disclosed, the various embodiments of the present invention effectively incorporate the essential concepts thereof into completely self-contained, compact sewage disposal systems, wherein the only requirements for successful operation of the systems are a continuous supply of oxygen-containing gas, in relatively low volume, together with aqueous liquid in sufficient quantity to substantially replace clarified liquid effluent discharged from the systems. Particular embodiments include a highly compact air-liquid system (FIGS. 1–4) wherein the fibrous material is supported within one or more aqueous liquid bodies through which the oxygen-containing gas is passed under slight pressure, a like system (FIGS. 5–7) making use of dispersed components of the same general type, and a compact air system (FIGS. 8–11) wherein the circulation of oxygen-containing gas is naturally induced. The latter embodiment relies principally upon micro-organisms of the aerobic type whereas the former embodiments rely on micro-organisms of both aerobic and anaerobic types.

In general, a particular object of the present invention is to provide a relatively simple, highly effective method for treating waste liquids such as sewage and other liquid wastes, in relatively small compact, easily maintained units.

Another object of the invention is to provide a method and means of such character adapted to use in a closed cycle, completely self-contained sewage disposal system.

Another object of the invention is to provide an improved method and means of the above character which does not require expensive or complicated circulatory systems, pumps or related machinery, and which is adapted to use in the compact space normally available in marine, aircraft and vehicular applications.

A further object of the invention is to provide a novel method and means for effectively treating waste liquids in the manner described, under conditions of either frequent or occasional use of the system.

Additional objects and advantages of the invention will appear from the following description in which illustrative embodiments have been set forth in detail in conjunction with accompanying drawing.

DESCRIPTION OF THE PREFERRED EMBODIMENTS

Generally stated, the present invention is predicated upon the establishment and maintenance, within a generally closed circulatory system, of a balanced biological community capable of effectively processing and consuming contaminating solid wastes (both colloidal and gross). Means in the form of strips or bundles of substantially individualized fibers are placed within the closed system to provide a home or resting place for the biological communities. An oxygen-containing gas is introduced to the closed system, simultaneously with the waste liquid undergoing treatment, and moved or percolated through the system to assist in the establishment of favorable ecological conditions. Assuming, for example, the introduction of sewage or other waste liquid, the conditions within the closed systems are such that the contaminating solids nurture biological activity to consume and to remove the solids, simultaneously with aeration of the circulating waste liquid to reduce the biological oxygen demand (BOD). The presence and circulation of the oxygen-containing gas favors the maintenance of such conditions and also the establishment and maintenance of balanced biological communities which are highly organized to attack and consume the waste solids. From a practical standpoint, the described processing permits the use of relatively small, compact, easily maintained units which are particularly adapted to use in the limited space normally available in marine, aircraft and vehicular applications.

Compact aerobic-anaerobic system

The embodiment of the invention illustrated in FIGS. 1–4 makes use of balanced biological communities of both both aerobic and anaerobic micro-organisms. As hereinafter described the aerobic micro-organisms thrive in the moist air or liquid-air conditions existing in the treating chambers of the present invention. Mixed communities of aerobic and anaerobic micro-organisms likewise thrive as submerged micro-biological communities within aqueous liquid bodies also found in one or more of the treating chambers. In every case, the micro-biological communities are supported by and live within redwood bark fibers or other fibrous material held within the chambers.

Figures 1, 2, 3, 4:
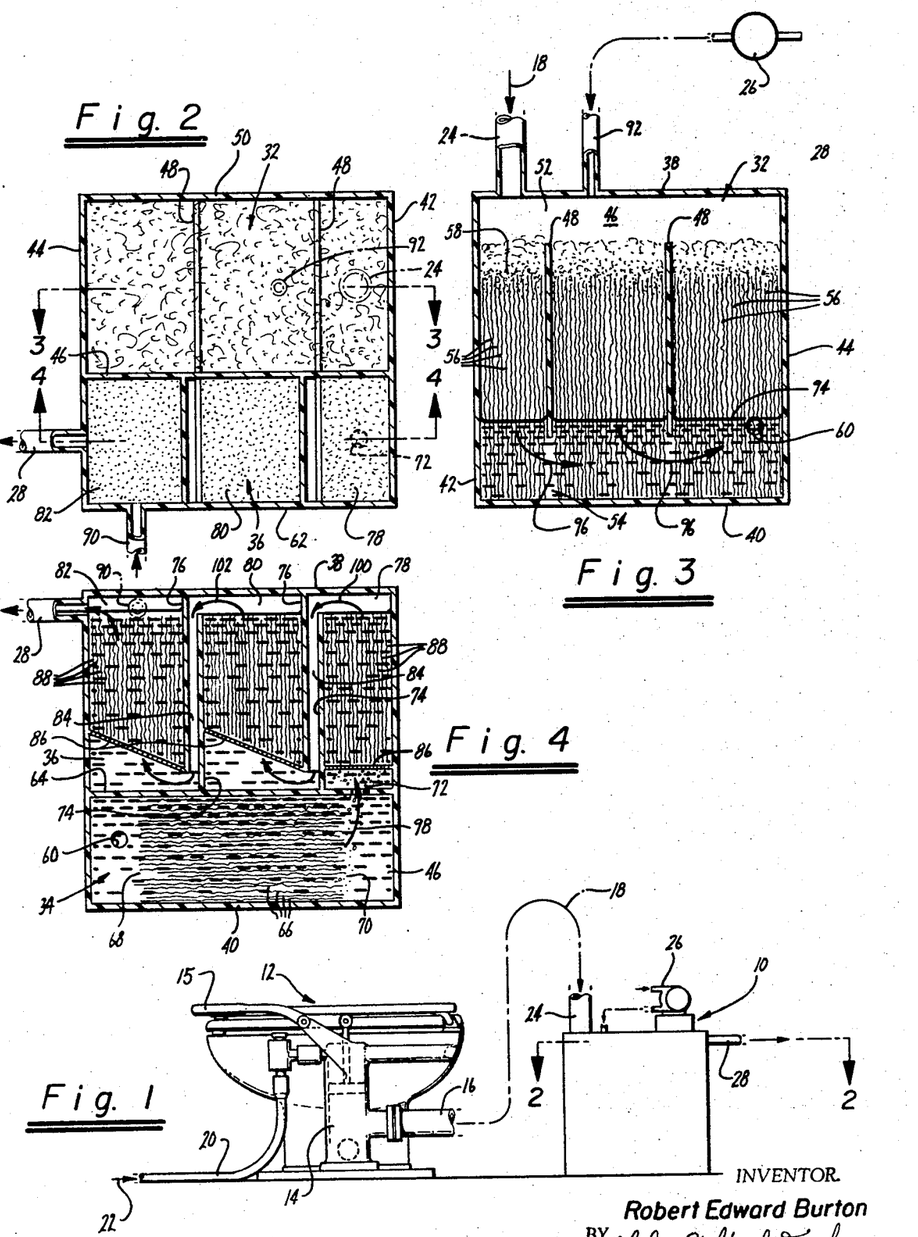
FIG. 1 is a schematic view in side elevation of one embodiment of a liquid waste treating system in accordance with the invention, shown in conjunction with a conventional marine toilet.
FIG. 2 is an enlarged view in horizontal section along the line 2—2 of FIG. 1.
FIG. 3 is a view in vertical section along the line 3—3 of FIG. 2.
FIG. 4 is a like view along the line 4—4 of FIG. 2.

Referring particularly to FIG. 1, a closed liquid waste treating system 10 is shown in comparative scale with reference to a compact toilet unit (e.g., marine toilet) represented at 12. The toilet unit can be of conventional type, employing a double acting pump 14, operated by the manual lever 15. As will be understood, the pump 14 operates to discharge the contents of the toilet through the waste conduit 16 (arrow 18) simultaneously with introduction of water to flush the toilet through the conduit 20.

As illustrated in FIG. 1, the wastes from the toilet 12 in the form of solids, liquids, paper and similar wastes, are discharged directly to the inlet 24 of the waste treating system 10. Because of its relatively small size, the waste system 10 can be positioned at any convenient location with reference to the environment of use (e.g., aircraft, bus, trailer, boat, etc.). The only limiting feature in this regard is the capacity of the pump 14 to distribute the waste liquids in appropriate fashion to the treating unit. As further illustrated in FIG. 1, the waste unit 10 operates in conjunction with means 26 adapted to continuously supply oxygen-containing gas (e.g., air) to the top of the treating unit. In normal operation, the mechanism 26 operates to establish a slight pressure of such gas (e.g., 1 to 3 p.s.i.g.) on the inlet side of the treating system 10. As hereinafter described, the waste treating system 10 functions to effectively remove solids while restoring oxygen to such liquids so that a clarified effluent having a relatively low biological demand (e.g., less than about 1000 p.p.m.) can be discharged from the system through the outlet 28.

As particularly illustrated in FIGS. 2 through 4, the waste treating unit 10 is generally cubicle or rectangular in shape and is subdivided by interior partitions into three generally distinct or separate chambers: an inlet chamber 32, an intermediate chamber 34, and a discharge chamber 36. The first or inlet chamber 32 is generally coextensive with the vertical dimensions of the unit 10 and, as particularly illustrated in FIG. 3, is formed by top and bottom walls 38 and 40, side walls 42 and 44, and a partition 46 secured in water tight relation to each of the named top, bottom and side walls. The inlet chamber 32 is further subdivided by the baffles 48 extending between the interior partition 46 and side wall 50. The baffles 48 are of less dimension than the side walls so as to provide space at the top and bottom of the inlet chamber 32 for the circulation of gas and liquids (represented at 52 and 54 respectively in FIG. 3). The baffles also cooperate with the side walls and interior partition 46 to provide a means supporting a plurality of natural bark fibers 56 in a generally upright position. As represented in FIG. 3, these bark fibers may be in the form of masses or bundles of elongate substantially individualized bark fibers (e.g., redwood bark fibers) which are supported in vertically oriented relation on the bottom 40 of the treating unit 10. The bark fibers 56 are preferably of different lengths so as to present a nonuniform upper surface 58 to receive and partially support solids entering the system through the inlet 24. As illustrated in both FIGS. 3 and 4, the inlet chamber 32 is provided with a discharge opening 60 which also functions as an inlet to the intermediate inlet chamber 34.

Referring to FIG. 4, the intermediate chamber 34 extends horizontally adjacent the lower portion of the inlet chamber 36 and is formed by sidewalls 42 and 44, the partition 46 and the opposite side wall 62, the bottom wall 40 and a horizontally extending partition 64. The intermediate chamber 34 likewise contains a plurality of elongated strips of bark fiber, in this case positioned in a generally horizontal arrangement. Again the bark fibers 66 are of varying length to present uneven surfaces 68 and 70 at either end of the mass or bundle of fibers. The intermediate chamber 34 is similarly provided with an outlet 72 provided in the horizontal position 64, at an end of the chamber opposite from the inlet 60. As before, the outlet 72 functions as an inlet to the third or discharge chamber 36.

As particularly illustrated in FIGS. 2 and 4, the chamber 36 is subdivided by upstanding baffles 74 which are positioned closely adjacent the baffles 76 so that a series of intercommunicating compartments are formed at 78, 80 and 82, generally in communication with the outlet 28 of the unit 10. It will be understood that the chamber 36 is generally formed by the sidewalls 42 and 44, the vertical partition 46 and sidewalls 62, and the horizontal baffle 64 and top wall 38. The baffles 74 are spaced from the top wall 38 and positioned closely adjacent the depending baffle 76 so as to provide overflow passages 84 for liquids circulating from the compartment 78 to the compartment 80, and from the compartment 80 to the outlet compartment 82. Each of the compartments is suitably provided with a fluid pervious support in the form of a grill or screening means 86 for an upstanding mass or bundle of bark fibers 88. Again the bark fibers are dimensioned appropriately to the size of the compartment and to provide a suitable environment or resting place for a biological community. However, in this regard, the outlet compartment 82 may additionally be provided with an inlet 90 for a purifying chemical (e.g., sodium hyperchlorite or chlorine) so that the effluent liquid discharged from the outlet 28 may be free of any microbiological contamination.

As noted, each of the main chambers 32, 34, and 36 of the unit 10 are substantially filled with a mass or bundle of strips of bark or bark fibers. In general, for this purpose, I prefer to provide a profusion of specially processed bark strips composed of redwood or like bark fibers, wherein the strips have been subjected to longitudinal and transverse shear stresses designed to break down the fiber structure of the strips and to open the fiber structure without changing the overall configuration of the bark strips. Such processing serves to greatly enlarge the exposed surface area of the individual bark fibers in each strip, and thereby greatly multiply the bark fiber surface exposed to currents of liquid and oxygen containing gas circulating through the bark fiber sections. More specifically, the bark fibers represented at 56, 66 and 88 in FIGS. 3 and 4, can be of the type produced by an existing machine consisting of a pair of pressure rolls provided with encircling ridges or convolutions which mesh with one another and firmly grips strips of bark fed endwise into the machine. Guide rolls associated with the machine serve to bend the bark into a generally U-shaped configuration as it passes through the pressure rolls. The described machine operates to simultaneously subject the bark to bending and rolling shear to break down the long fibers and spread these fibers transversely. Strips of bark processed with this machine retain their initial strip configuration but are uniquely characterized by an exceptionally large internal surface area. This internal surface, which generally corresponds to that of a mass of substantially individualized fibers, increases the total exposed surface area of the fibers sufficiently to provide an optimum resting place or home for the microbiological communities nesting within the fibers. By way of illustration, I have found the surface area of bark fibers treated in the described fashion to be of the order of 600 to 700 square feet per cubic foot of bark, and frequently as high as 800 to 1000 square feet per cubic foot. In any event, the combined internal and external surface area per cubic foot of bark (in each of the chambers 32, 34, and 36) should not be less than about 500 square feet per cubic foot.

Bark strips and bark fibers of the type described, particularly redwood bark fibers, are easily obtained from conventional lumber mill operations. As is well known, the methods employed in lumbering the California redwood, Douglas fir, and similar commercial woods, produce substantial amount of bark. By way of illustration, the unusual thickness of redwood bark (e.g., averaging 2 to 10 inches in old growth), normally produces as much as 400 to 600 cords of bark per million feet of board measure (Spalding). Strips of bark obtained from conventional debarking and shredding operations normally range from 8 to in excess of 20 feet in length. This bark can be processed in the manner described above to produce the desired masses or bundles of bark for the chambers 32, 34, and 36. Alternatively, the bark can be obtained from conventional lumber mill operations of the type conventionally employed to separate the dust from the fibers. Approximately, 50% of the bark sold and processed is recovered from conventional debarking, shredding and dust separation operations (e.g., employing hydraulic debarkers, belt type shredders, swinging hammer-type hogs, flailes, etc.) in the form of relatively elongated fibers adapted to use in the present invention.

In general, individual fibers obtained from the foregoing processing either individually or as separated, elongated fibers and strips of bark, have a diameter which is not in excess of about 1 millimeter. The length of the fibers will vary according to the particular processing employed. However as hereinafter noted, bark fibers employed in the present invention preferably have a length ranging from about 5 to 12 inches with an average length of about 9 inches.

In practicing the present invention in conjunction with the apparatus illustrated in FIGS. 1 through 4, water or waste liquid is introduced through the inlet 24 to establish desired liquid levels within the separate chambers of unit 10. Thus, under normal conditions the liquid level in the chamber 32 will coincide roughly with the top of the discharge opening 60, as is particularly illustrated in FIG. 3. This liquid level is established primarily by the positive gas pressure maintained in the space 52, at the top of the chamber 36. As previously noted, the mechanism 26 functions to continuously introduce an oxygen-containing gas to the top of the chamber 32, for example, through the inlet 92. Conveniently, the air pressure in the space 52 can be maintained by means of a small air compressor and pump, as represented schematically in FIG. 1. By way of illustration, the mechanism 26 can comprise an aquarium-type compressor wherein a very small motor (e.g., 0.01 horsepower) functions to drive a small piston to pump air through the inlet 92 to the air space in the top of chamber 32. Desired air pressures for this purpose are of the order of 1 to 3 p.s.i.g. (optimum 1.5 p.s.i.g.). In general, the described slight air pressure will normally hold the liquid level at the top of the outlet 60. However, upon introduction of additional amounts of liquid to the unit 10 (through operation of the toilet 12) the increase in the liquid level in the chamber 32 cooperates with the positive air pressure to force liquid through the opening 60 into horizontal chamber 34. As a consequence, under normal conditions of use, the chamber 34 will be entirely filled with liquid. In like fashion, introduction of liquid to the unit 10 will cause the compartment 78 in the chamber 36 to fill to the level established by the baffle 74, which functions as a weir. In similar fashion, the compartment 80 in chamber 36 will be normally filled with liquid to the top of the upstanding baffle 74, whereas the compartment 82 will be filled with liquid to the approximate level of the discharge outlet 28.

In accordance with the invention, each of the masses or bundles of bark fibers supported in the separated chambers of the unit 10 provides a place of residence for a microbiological community capable of feeding upon and consuming organic solid waste materials. However, because of different conditions existing in the separate chambers, the microbiological communities will be of different character and of slightly different types. More specifically, the organisms in chamber 32 will be principally aerobic microorganisms adapted to life support in moist air or in a liquid-air system. Such organisms which may be bacteria, paramecium, small worms, snails, and like aerobic vertebrates and invertebrates, which may be naturally present in the waste liquids introduced to the system, or which may be artificially introduced to the system. Regardless of the mode of introduction, the aerobic organisms and micro-organisms thrive within and upon the surfaces of the fibers 56, continuously attacking and digesting the gross and colloidal solids which collect within the bark fibers, and function to continuously separate the solid contaminants from the entering waste liquids. In contrast, the microbiological community in the submerged chamber 34 tends to be of an aquatic (i.e., primarily aerobic but partially anaerobic) character, adapted to life support below the surface of the liquids. Such microorganisms include plankton, nematodes, crustacea, coleopetra, underwater worms, snails, beetles, and like aquatic life. However, despite the slight difference in character of the microbiological community in chamber 34, the function is substantially the same in that the microorganisms live within the fibers 66 where they feed upon any remaining contaminants discharged from the inlet chamber through the opening 60. In like fashion, the microbiological communities present in the bark fibers 88 within the chamber 36 function to complete the removal of any remaining solid organic materials so that the effluent discharged at 28 is sufficiently clarified to permit its discharge into the soil or into lakes or streams. In general, the microbiological communities in the fibers 66 of chamber 34 and the fibers 88 of chamber 36 will be of a mixed aerobic and anaerobic type, due to a continuing circulation of oxygen-containing gas from the chamber 32. It will be understood that this gas passes through the intermediate chamber 34 into the chamber 36 where it passes beneath the baffles 76 and up through the fibers 88 to the intermediate air spaces 84.

In general, in maintaining the microbiological communities in the various chambers of the unit 10, the bark fibers provide convenient resting and breeding places for the bacteria, plankton, crustacea, and other organisms, and serve also to prevent such microorganisms from being swept through the unit by flow of circulating liquid. On the other hand, the circulation of liquid through the system, from time to time, serves to maintain temperature conditions which are desirable for continued life of the microbiological communities. As is well known, the energy of the community is dissipated in different ways. For example, energy received from feeding on the waste solids in the liquid (or upon other micro-organisms lower on the scale) contributes primarily to the metabolism and movement of the micro-organisms, whereas smaller portions of the energy are discharged as waste and are used in promoting the growth. Since much of the energy used in the metabolism is converted to heat, liquid systems provide an ideal environment for maintaining desired temperature balance for life processes.

The processing of the present invention is best understood by reference to particular use of the system in the treatment, for example, of raw sewage for like material, contaminated with gross or colloidal organic solids. With particular reference to FIGS. 1 to 4, the contaminated liquid containing such solids enters the system through the conduit 24 at each use of the toilet 12. Within the inlet chamber 32, the solids tend to collect on the upper surface of the fibers 56 and to work down into the fibers due to the uneven upper surfaces of the fibers represented at 58. Since the waste system 10 is particularly adapted for marine, rail, vehicular or aircraft use, the liquid introduced to the chamber 32 will generally be in motion so that the surfaces of the fibers extending above the liquid level at 94 will remain moist, thereby favoring the maintenance of the conditions desired for life support of the biological community within the chamber 32. The fibers 56 will also be maintained in a relatively moist condition by the inflow from time to time of waste liquids which will raise the liquid level to a higher position within the chamber 32. In general, within the chamber 32 there is an initial "composting" of the solids which work their way down into the fibers 56 and into the liquid in the bottom of the chamber. The increase in the liquid level, on flushing the toilet, will also increase the liquid pressure on the inlet side of the opening 60 so that liquid and air pressure will force additional liquid through the opening 60 to the chamber 34. Alternatively, under conditions of relatively long nonuse of the treating system 10, evaporation of water from the system will tend to lower the liquid level with respect to the opening 60 so that some air will be allowed to freely pass through this opening into the intermediate horizontal chamber 34. In like fashion, movement of the treating system 10 to effect sloshing or movement of the liquid in the lower portion of chamber 32 (arrows 96) will also promote some movement of air into the chamber 34.

Within the chamber 34, the space on the inlet side adjacent the opening 60 will normally be filled with liquid so that any amounts of air passing through the opening 60 will rise to the top of the chamber and pass underneath the baffle 64 to the horizontal outlet 72. On the other hand, any contaminating solids entering the chamber 34 will pass into the mass of horizontally disposed fibers 66 where the contained microbiological community acts progressively to devour and remove any remaining contaminating solids. As a consequence, the liquid passing through the fibers 66 and into the outlet chamber 36 (arrow 98) will be relatively free of contaminating solids. On the other hand, such solids as remain will be devoured and separated by the microbiological communities existing in the fibers 88 within the compartments 78, 80 and 82 of the outlet chamber. Since a certain amount of air passes through the opening 72 and upwardly through the compartments 78, 80 and 82, at least a portion of the biological communities in these compartments will be of the aerobic or air breathing type.

Within the outlet chamber 36, clarified or partially clarified liquid entering compartment 78 passes by gravity over the baffle 74 (arrow 100) together with any pair passing upwardly through the compartment, and passes under the baffle 76 and through the grill 86 into the liquid fiber system in compartment 80. There, the process is repeated and liquid and air pass over the top of the baffle 74 (arrow 104), and through the air passage 84 to the bottom of the compartment 82. In compartment 82, the process is repeated with clarified effluent leaving the system through the outlet conduit 28. As noted previously, a suitable chemical such as a chlorine release agent, sodium hyperchlorite or other purifying agent may be introduced through the top inlet to insure that the final effluent is free of microbiological contamination.

As is well known, the metabolism of aerobic organisms requires the presence of substantial amounts of dissolved oxygen in the aqueous media employed. On the other hand, waste liquids such as sewage, canning wastes and the like are notably deficient in dissolved oxygen, and are characterized by substantial biological oxygen demand (BOD). This demand is satisfied or reduced in the practice of the present invention by the continuous metering of an oxygen-containing gas through the mechanism 26 in the top of chamber 36. Where a continuous supply of electricity is available, the introduction of air is to be preferred because of convenience and low cost. However, in the case of marine applications, rail cars and the like, the source of oxygen might easily be an oxygen cylinder adapted to supply oxygen at a rate approximately ⅓ that of the air supply. In general, it is only necessary that a sufficient supply of oxygen be circulated through the pressurized system, in the form of dissolved oxygen, to maintain the biological communities present in the chambers of the waste treating system 10.

A particular advantage of the present invention, arising in part from use of a pressurized system, resides in the ability to dimension the waste treating system 10 to a scale compatible with the requirements of varied marine, aircraft and vehicular applications. By way of illustration, in a typical installation employing the system of apparatus of FIGS. 1 to 4, for example in a portable toilet, the unit 10 can be dimensioned as follows: waste treating tank—14 inches square by 14 inches in depth, treating chamber 32—14 inches in depth and length by 8 inches in width (fibers ranging from 5 to 12 inches, average 9 inches), chamber 34—14 inches in length by 6 inches in width by 5 inches in depth (fibers 5 to 12 inches, average 9 inches), chamber 36—14 inches in length by 6 inches in width and 9 inches in depth (fibers in compartments 78, 80 and 82—5 to 9 inches). The air inlet is of the order of 1200 cubic centimeters per minute (250 cc. when an oxygen cylinder is used) and creates pressure on the inlet side of chamber 32 of the order of 30 inches of water (i.e., 1.5 p.s.i.g.). The unit is capable of functioning at a rate equivalent to the capacity of the pump units normally associated with standard marine toilets (i.e., 5–8 gallons per day). In a typical operation, the entering waste liquid may have a biological oxygen demand (BOD) of the order of 4000 to 8000 p.p.m., a turbid color, and a dissolved oxygen content approaching zero. Upon entering the inlet chamber 32, the intermixed liquid and waste solids are held and composted within the fibers 56 permitting a substantial portion of the gross and colloidal solid particles to be attacked and removed by the biological community living within these fibers. Partially clarified liquid passes through the outlet 60 into the intermediate chamber 34 where remaining waste solids are subjected to a progressive removal by the microbiological community living within the fibers 66. The liquid then proceeds upward through the grill 86 and the fibers 88 in the compartment 78 passes over the baffle 74 to a position beneath the grill 86 and compartment 80. The liquid then passes up through the fibers 88 in compartment 80 and over the second baffle 74 to the bottom of the outlet compartment 82. The effluent discharged at 28 of the compartment 82 is free of settleable solids and is sufficiently clarified to permit discharge into lake streams or into the soil. The BOD of the treated discharge liquid (measured at 28 in FIG. 1) is generally less than 15 p.p.m. with clarity measures of the order of 80 to 90. The pH is approximately 7.0 and the dissolved oxygen content within the range from 2 to 10 p.p.m. The unit thus satisfactorily achieves the essential reduction in BOD simultaneously with the desired increase in the dissolved oxygen content. From an operational standpoint, the liquid effluent is substantially free of solid contaminants and upon being subjected to a minimum chlorination in the outlet compartment 82 (i.e., 5 cc. of a 4.75% sodium hyperchlorite solution per each 22 cc. of effluent, introduced through conduit 90), has a coliform count per 100 milliliters of 0 to less than 70 m.p.n. Thus, from a practical standpoint, chlorination may be achieved through use of a relatively small amount of a household bleach such as "Clorox" (The Clorox Company).

Because of the simplicity of the design of the waste system 10 (consisting primarily of exterior walls and interior partitions), the described apparatus is easily fabricated and may be manufactured from low cost, inexpensive, easily handled materials. By way of illustration, the waste unit 10 can be relatively easily molded or fabricated from suitable plastic materials (thermo-setting or thermo-plastic), the only requirement being a relative inertness of the selected resinous or polymeric material to the chemicals or waste substances in the waste liquids undergoing treatment. In general, thermo-setting resins selected from the group of phenolic, alkyd, aminoaldehyde, urea or melamine-formaldehyde, polyester (unsaturated) and alkyl resins may be satisfactorily employed in fabricating the waste treating unit 10. In view of the fact that the waste treating system is not likely to encounter extremes in temperature, suitable thermoplastic resins such as cellulose derivatives and various polymer resins such as polyethylene, acrylate, vinyl, styrene, coumarone or polyamide resins may also be employed. In general, fabrication techniques appropriate to the selected resin may be employed. In this regard, it will be understood that the interior baffles and components, such as the grills or screens 86, may likewise be fabricated from the same or a compatible resinous material.

Dispersed aerobic-anaerobic system

Figure 5:
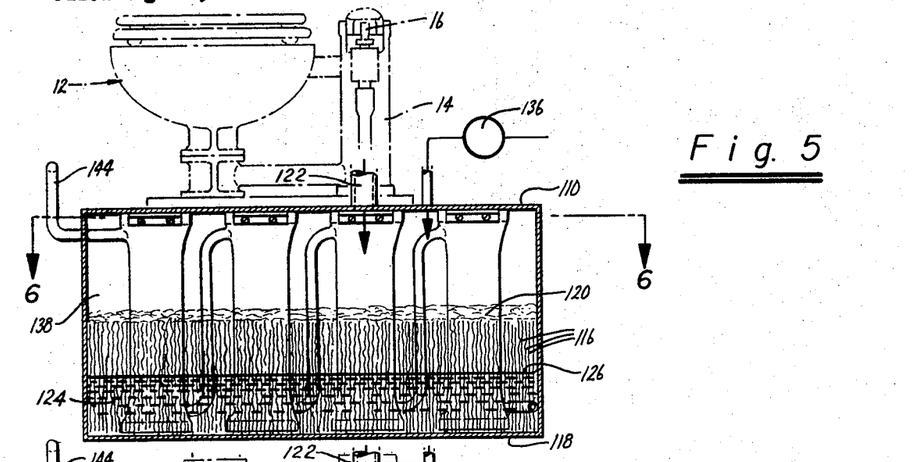
FIG. 5 is a view in vertical section illustrating another embodiment of a liquid waste treating system in accordance with the invention.
Figure 6:
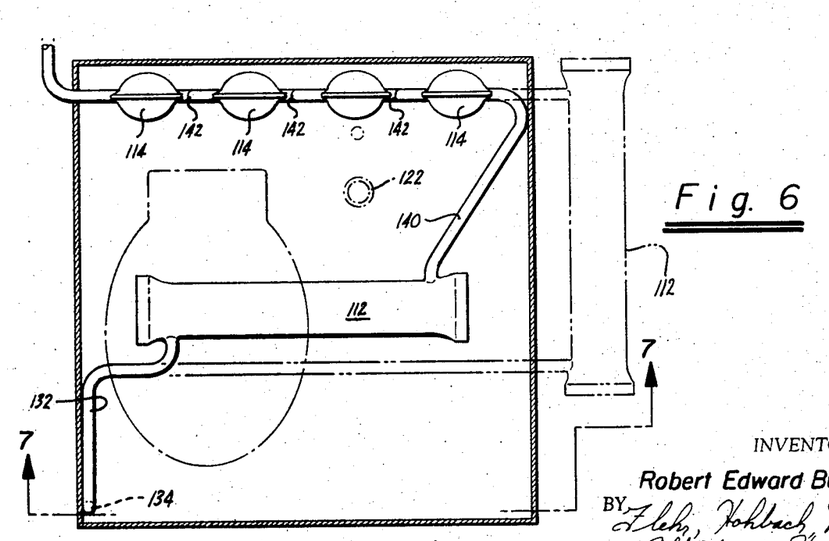
FIG. 6 is a view in horizontal section along the line 6—6 of FIG. 5.
Figure 7:
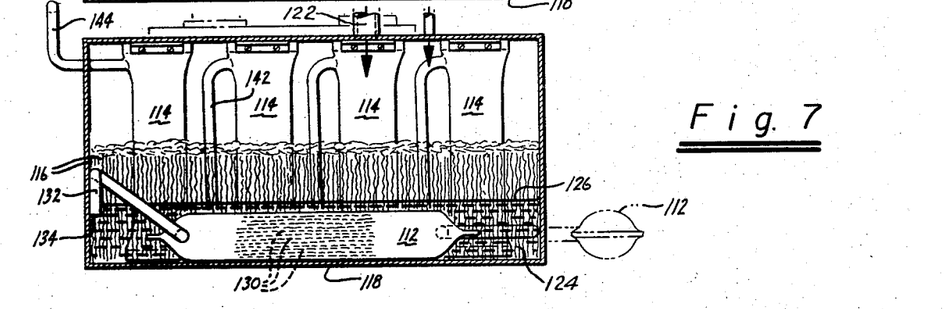
FIG. 7 is a view in vertical section along the line 7—7 of FIG. 6.

The embodiment of FIGS. 5–7 makes possible a variation in the processing generally described above, and in the use of the apparatus herein disclosed. Thus, in certain applications where a compact arrangement is not essential, it may be advantageous to employ a larger number of separate chambers or compartments or, alternatively, to locate the separate chambers at spaced locations with respect to one another. Such arrangement might be advantageous, for example, where it is desirable to distribute the weight of the separate components, as in aircraft installations (dotted lines FIGS. 6 and 7). Alternatively, of course, the various components can be assembled into one relatively compact unit (full lines FIGS. 5–7.)

For purposes of illustration, FIG. 5 illustrates a scheme for mounting a toilet unit directly on or adjacent the waste treating system. Modification of the mechanism for pressurizing the treating system is also possible, as will appear in the following description related to this embodiment. I have also found that many variations are possible in the makeup of the biological communities established in the separate compartments or chambers of the waste treating system.

Referring particularly to FIGS. 5 through 7, a waste treating system is illustrated in the form of a shallow rectangular tank 110 within which are positioned a series of separate horizontally and vertically arranged treating chambers 112 and 114. As hereinafter explained the tank 110 and chambers 112 and 114 correspond generally to the chambers 32, 34, and 36 of the compact unit illustrated in FIGS. 1 and 4. The various components of the system, including the tank 110 and the chambers 112 and 114, can likewise be molded or fabricated from suitable thermosetting or thermoplastic materials. The various conduits by which the chambers are interconnected and placed in fluid communication with the tank 110 may also be fabricated from the same or a compatible resinous material. By way of specific illustration, the chambers 112 and 114 may be conveniently formed in the illustrated pillow shapes, from cylinders of polyethylene or polyvinyl chloride which are cut and sealed at the ends. Such construction insures a relative ease of fabrication together with a desired degree of inertness to the chemicals or waste substances in the liquid undergoing treatment.

Referring to FIGS. 5 and 6, the tank 110 is illustrated as a closed, generally rectangular chamber in which a plurality of natural bark fibers 116 are supported in a generally upright position. As in the previously described embodiment, these bark fibers may be in the form of bundles or masses of elongate substantially individualized bark fibers (e.g., redwood bark fibers) which are supported on the bottom 118 of the tank 110. The bark fibers 116 are preferably of differing lengths so as to present a non-uniform upper surface 120 on which the entering solids collect and are partially supported. In this regard, the wastes discharged from the toilet 12 (through action of the pump 14) enter the top of the tank 110 directly through the inlet opening 122 (FIG. 6). Within the tank 110, the waste solids are held and composted within the upright fibers 116, where they undergo attack and digestion by the biological community living within these fibers. As in the prior embodiment, the organisms in the tank or chamber 110 will be principally aerobic microorganisms, capable of living in moist air or in a liquid-air environment. In a mobile installation, such as in an aircraft or rail car, the liquid in the bottom of the tank 110 (generally represented at 124) will usually be in motion so that the surface of the fibers extending above the liquid level at 126 will remain moist.

Referring to FIG. 7, the chamber 112 is shown in the form of an elongate pillow-shaped receptacle which is supported horizontally on the bottom 118 of the tank 110. The chamber 112 thus generally corresponds to the chamber 34 of the embodiment of FIGS. 1 to 4. As illustrated, the chamber 112 contains a plurality of elongated strips of bark fiber 130, likewise arranged generally horizontally. As best illustrated in FIGS. 6 and 7, the pillow unit or chamber 112 is in fluid communication with the liquid in the bottom of the tank 110 through the conduit 132. The liquid level is generally established, as before, by the height of the conduit opening 134 with reference to the bottom of the tank.

As further illustrated in FIG. 5, the tank 110 is provided with means 136 to continuously supply an oxygen-containing gas to the space 138 adjacent the top of the tank. The mechanism 136, which may be a small pump, functions in the previously described manner to establish a slight positive pressure above the level of the liquid, to assist in forcing the liquid through the conduit 132 and to generally hold the level established by the conduit opening 134. As will be understood, operation of the toilet unit 12 will serve to increase the liquid level in the tank 110, and thereby assist the positive gas pressure in forcing the liquid through the conduit 132 into the pillow unit 112. Conversely, during non-use of the treating system, the positioning of the conduit 132 and opening 134 will permit some circulation of oxygen-containing gas through the units 112 and 114.

As best shown in FIG. 6, the unit 112 is in communication with a series of vertical pillow units or chambers 114 by means of the conduit 140 and the interconnecting conduits 142. The units 114 are generally similar in construction to the unit 112, and similarly contain a plurality of bark strips or fibers arranged vertically and generally parallel to the upright axes of these units. It will be understood that the bark fibers in the chambers 114, and in the chamber 112, provide suitable resting places for the biological communities present in each of these units. The bark fibers thus function similarly to the bark fibers in the previously described environment, in assisting in the establishment and maintenance of solids-consuming biological communities in each of the chambers 112 and 114.

In general, the combined liquid and gas pressure in tank 110 forces waste liquids first through the unit 112 and then successively through each of the units 114 to the discharge conduit 144. During such passage, solid contaminants which are not initially removed in chamber 110 are progressively consumed by the biological communities in the units 112 and 114, with the result that a clarified effluent leaves the system through the outlet conduit 144.

In the principal embodiment illustrated in FIGS. 5 to 7, the pillow unit 112 is positioned within the tank 110. However, as noted previously, it may be advantageous or desirable in certain installations to locate various of the treating chambers externally of the system, or at spaced locations with respect to one another. Such an arrangement is suggested by the dotted line position of chamber 112 in FIGS. 6 and 7, which indicates that this treating chamber 112 may be positioned externally of the tank 110. The illustrated modification, as well as other similar variations in the construction and location of the treating chambers, is clearly within the scope of the present invention.

The operation of the embodiment illustrated in FIGS. 5 through 7 can be briefly summarized as follows:

Assuming the introduction of a waste liquid through the inlet 122, the resulting increase in the gas pressure and liquid level in tank 110 will cause waste liquid to flow into the treating unit 112 and on into the subsequent treating units 114. Simultaneously, the solids in the entering waste liquid will be deposited on the surface of the fibers 116 in the tank 110. The net effect is that the solid wastes (gross and colloidal) will be initially composted in and on top of the fibers 116, where they will be subject to attack by the microbiological community living within the fibers 116. Partially clarified liquid entering the treating unit 112 will be subjected to further clarifying activity of the microbiological community (essentially anaerobic) living within the fibers 130. Thereafter, substantially clarified liquid passing through the conduit 140 to the initial upright treating chamber 114, and subsequently through the conduits 142 to the succeeding treating chambers 114, will be subjected to the progressive action of the biological communities within the latter treating chambers, which function to consume and remove any remaining solid wastes. The net effect of introducing additional waste liquid to the system, therefore, is to cause the discharge of clarified effluent through the outlet conduit 144.

In a typical operation, waste liquid entering the system through the conduit 122 may have a dissolved oxygen content of the order of 0.5 to 1 p.p.m., as well as a substantial content of colloidal and gross solids. In contrast, the discharged liquid will be free of solid contamination and will have a relatively high oxygen level, of the order of 2 to 5 p.p.m. In this regard, the treating system of FIGS. 5 to 7 functions in substantially the same fashion as the treating system described in conjunction with FIGS. 1 to 4.

Compact aerobic system

FIGS. 8 through 11 illustrate a further embodiment of the invention, particularly adapted for use where space may be at a premium and where external sources of power are not readily available (e.g., military installations, construction zones, mountain cabins, etc.). In general, the embodiment of FIGS. 8 through 11 differs from the previous embodiments in its reliance on essentially aerobic microorganisms to which air is supplied by natural draft circulation.

Figure 8:
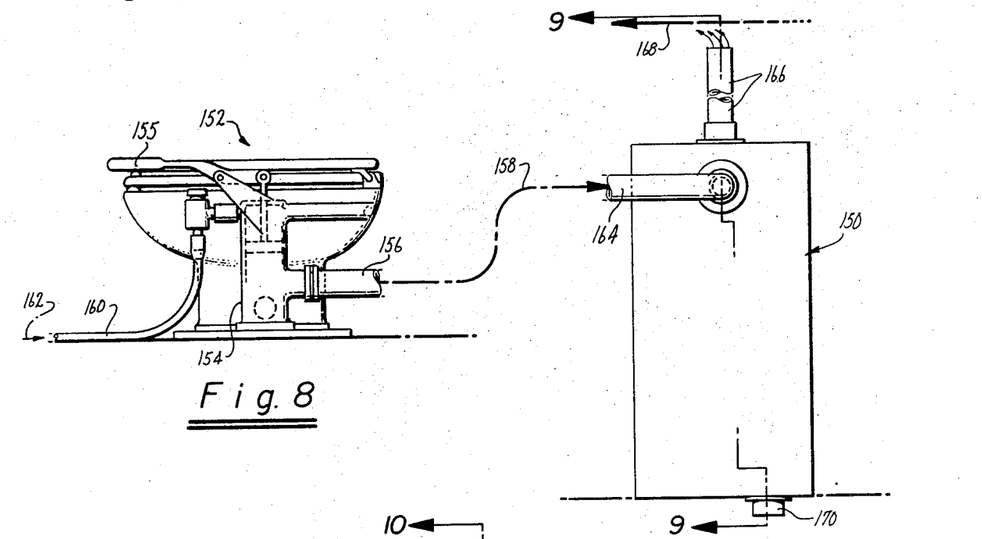
FIG. 8 is a schematic view, similar to FIG. 1, illustrating still another embodiment of a liquid waste treating system in accordance with the invention.

With particular reference to FIG. 8, a closed air system of the type described is shown at 150 in comparative scale as respects the marine type toilet unit shown at 152. The construction and operation of this toilet unit can be similar to the toilet unit previously described, employing a double acting pump and operating lever 154, 155 to discharge the contents of the toilet through the waste conduit 156 (arrow 158) while simultaneously drawing flush water through the conduit 160 (arrow 162). Such operation discharges the wastes from the toilet (liquids and solids) directly to the inlet 164 of the waste treating system 150.

In contrast to the embodiments previously described, the waste system 150 employs a conventional draft opening or vent 166. The upper end of the vent 166 is positioned externally of the toilet enclosure so as to be exposed to prevailing winds (arrow 168), which create a draft in the vent for purposes of inducing a natural circulation of air through the waste system 150. More specifically, as will hereinafter be described, the draft in the vent 166 causes oxygen-containing air to be drawn upwardly through the waste outlet 170 located at the botttom of the unit.

Figure 9:
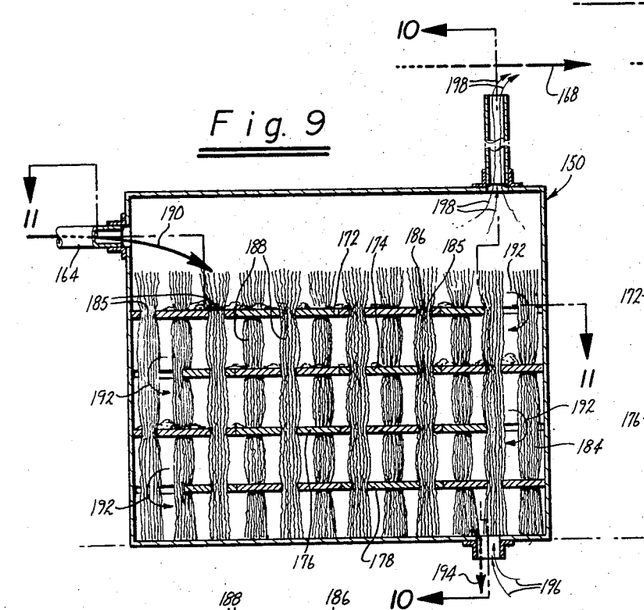
FIG. 9 is a view in the vertical section along the line 9—9 of FIG. 8.
Figure 10:
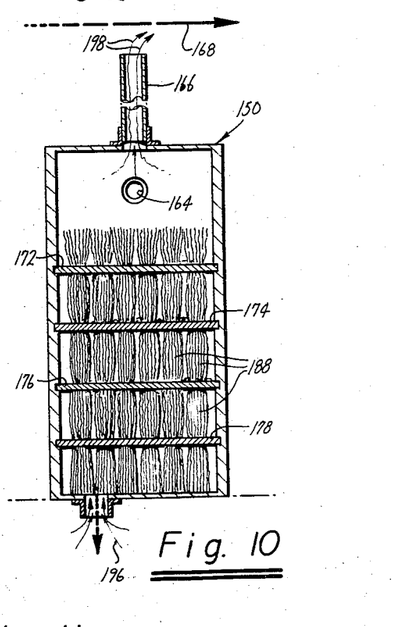
FIG. 10 is a like view along the line 10—10 of FIG. 9.
Figure 11:
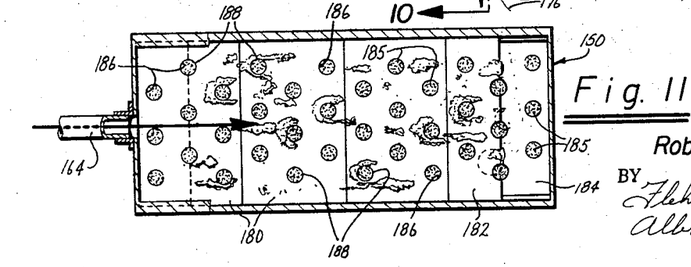
FIG. 11 is a view in horizontal section along the line 11—11 of FIG. 9.

As best illustrated in FIGS. 9 to 11, the waste treating unit 150 is generally rectangular in shape and is subdivided horizontally by a series of baffles 172, 174, 176 and 178 which are mounted in staggered relation. Thus, as shown in FIGS. 9 and 11, each baffle may comprise a series of segments 180 mounted with a partial segment 182 at one end so that a vertical flow path 184 is created at the end of the baffle. In addition each baffle including the segments 180, 182, is provided with a series of apertures or holes 186 which provide additional vertical flow paths through the baffles. As illustrated, individual apertures 186 in the respective baffles 172, 174, 176 and 178 are in vertical alignment so as to provide a convenient means for receiving and supporting bundles 188 of bark fibers or strips of the type previously described.

In the embodiment of FIGS. 8 to 11, the bundles of bark fibers 188 provide a place of residence for microbiological communities which are primarily of the aerobic type, and adapted to feeding upon and consuming the organic solid waste materials. As noted previously, the aerobic microorganisms are especially adapted to life support in the moist air conditions to be found in the essentially air-liquid system of the treating unit 150. Such aerobic organisms and microorganisms (e.g., small worms, snails, paramecium and like aerobic vertebrates and invertebrates) live within and upon the surfaces of the fibers 188, continuously attacking and digesting the gross and colloidal solids in the manner previously described.

Referring again to FIGS. 9 and 11 the described arrangement of the baffles causes the main flow of liquid and solid wastes entering at 190 to follow a generally reversing flow path, to and fro around the ends of the baffles, as represented by the arrows 192. Most of the gross solids are deposited and retained on the upper baffle 172, due to the staggered interrupting relation of the protruding bundles of fibers 188. The liquid which is separated from the solids passes over the end of the baffle 172 to the baffle 174 below, and also downward through the flow paths 185 formed within the interstices of the bundles of fibers passing through the holes 186. Continuing movement of the liquid along the surface and through the flow paths 185 of the baffle 174 effect a further removal of solids, and permit a continuing flow of liquid in a substantially non-clogging manner. Throughout this operation, the microorganisms living within and upon the fibers in the bundles 188 continually attack and feed upon the contaminants in the liquid to effect clarification and purification of the same. This treating process continues as the liquid moves downward along and through the baffles 176 and 178 so that the liquid moving across the bottom of the tank 150 through the discharge outlet 170 (arrow 194) is sufficiently clarified that it may be discharged directly into the soil, or into lakes or streams.

As previously noted, the micro-biological communities in the fiber bundles 188 are essentially aerobic, due to a continuing circulation of oxygen-containing air upwardly through the discharge outlet 170. This upward flow of air is induced by the draft in the vent conduit 166 and effects a substantially continuous circulation of air upwardly through the fibers, through the flow paths 185 and around the end of the baffles, and eventually through the vent outlet, as indicated by the arrows 196 and 198.

The described construction and operation of the treating unit 150 provides a number of advantages. For example, during periods of heavy use, the unit is quite effective in resisting the normally destructive effects of clogging and flooding. It will be appreciated that if the unit were entirely filled with waste liquids, the aerobic micro organisms might be destroyed, particularly where submerged in liquids with a very high biological oxygen demand (BOD). In the described apparatus, these microorganisms can retreat through holes 186 in the baffles to the subsurface of the same where they can subsist in the air pocket and voids which will normally be present. Should the degree of clogging and consequent flooding of the upper levels be extreme, the aerobic microorganisms can retreat further down the fibers 188 to the subsurface of the lowermost baffles, for example, baffles 176 and 178 in the illustrated apparatus. In this regard, there is no particular limit on the number of baffles which may be effectively employed in the present invention, and satisfactory results have been obtained with units employing as many as twenty or more horizontally extending baffles. Thus, the treating unit of FIGS. 8 to 11 and variations thereof provide a unique advantage in that flooding of the upper levels will not destroy the capacity of the lower levels to function effectively to clarify and purify the waste liquids since the lower levels remain open, or at least partially open at all times.

It will be appreciated that the details as to size, numbers of baffles and flow path 185 and 192 will be determined by the designed capacity and the throughput of liquid and solid wastes likely to be encountered in the operation of a particular unit.

To summarize the operation of the embodiment illustrated in FIGS. 5 through 8, the solid wastes (gross and colloidal) are initially composted upon the within the bundles of fibers 188 protruding through the upper baffle 172. There they are subject to attack by the micro-biological community living within the fibers. Partially clarified liquid passing over the end of the baffle 172 moves along the upper surface of the baffle 174 where is it subjected to the further clarifying activity of the micro-biological community living at a lower level within the fiber bundles 188. Simultaneously the waste liquid trickles down the axes of the fiber bundles 188, through the flow paths 185, where it is clarified and filtered as it follows a relatively slow to and fro path to the discharge outlet 170. By following the described flow path around and through the succession of the baffles, and through the bundles of fibers 188, the waste liquid is effectively clarified so that the effluent from the outlet 170 is safe for discharge into the surrounding environment. In this regard, the effluent from the discharge conduit 170 will be substantially free of settleable solids (i.e. no more than about 5 to 10 ml. per liter) and will exhibit a measurable reduction in suspended solids (about 80%) and the BOD (about 90%). Thus, the treating system of FIGS. 8 to 11 functions effectively and in substantially the same fashion as the treating system of FIGS. 1 to 4 and 5 to 7. It differs, however, in its reliance on an induced circulation of oxygen-containing gas by natural draft through the discharge outlet 170 to the vent conduit 166.

Many additional variations are possible in the processing generally described above and in the use of the apparatus herein disclosed. For example, the embodiment of FIGS. 8 to 11, being particularly efficient in the handling of inflow without tendency towards clogging, can be effectively used as a first stage in conjunction with the embodiments of the waste treating system illustrated in either FIGS. 1 to 4 or FIGS. 5 to 7. In like fashion, if desired, the system of FIGS. 8 to 11 might be operated in conjunction with means to continuously supply and oxygen-containing gas under slight pressure, as in the other embodiments. These and other variations are clearly within the scope of the present invention.

From the foregoing, it will be apparent that the present invention provides a compact waste liquid treating system which is particularly suited for marine, rail, vehicular, and aircraft use. It also makes possible the effective treatment of waste liquids in a very small space, to produce clarified effluents that can be freely and safely discharged from the system. The treating systems are particularly advantageous in their capacity to operate continuously to effectively dispose of the solids and other wastes in waste liquids, such as sewage and other liquid wastes, with little or no maintenance or care. The treating systems are thus highly adapted to practical use in marine, aircraft, vehicular, and other mobile applications.

I claim:

1. In a method for separating organic solid waste materials from liquids, the steps of forming a first aqueous liquid body as part of a closed system, supporting a mass of elongate strips of generally fibrous material in said liquid body so that at least a portion thereof extends above the surface of said liquid body, said fibrous material forming a liquid-contact zone adjacent and co-extensive with said liquid body, said fibrous material containing and supporting a microbiological community capable of consuming organic solid materials, forming at least one additional aqueous liquid body as a separate part of said closed system, supporting an additional mass of elongate strips of generally fibrous material entirely within the confines of said additional liquid body to form a further liquid-gas contact zone within said additional liquid body, the fibrous material within said additional liquid body likewise containing and supporting a micro-biological community capable of consuming organic solid materials, introducing a waste liquid containing unwanted organic solids to said first liquid body, continuously introducing an oxygen containing gas to said closed system to thereby create a slightly positive gas pressure therein, whereby said oxygen containing gas is brought into contact with the micro-biological communities contained and supported within the masses of fibrous material in said aqueous bodies.

2. A method as in claim 1 wherein said organic solid waste materials are sewage wastes.

3. A method as in claim 1 wherein said oxygen-containing gas cooperates with the waste liquid introduced to the system to circulate said unwanted organic solids into contact with said micro-biological communities.

4. A method as in claim 1 wherein at least a portion of said micro-biological communities contained and supported within the masses of fibrous material in said liquid bodies is adapted to life support in moist air.

5. A method as in claim 1 wherein at least a portion of said micro-biological communities contained and supported within the mases of fibrous material in said liquid bodies is adapted to life support in aqueous liquid.

6. A method as in claim 1 wherein said oxygen-containing gas introduced to said closed system is air.

7. A method as in claim 1 wherein said oxygen-containing gas introduced to said closed system consists essentially of oxygen.

8. A method as in claim 1 wherein said first aqueous liquid body is formed as plural zones in liquid-gas communication with one another.

9. A method as in claim 1 wherein said additional aqueous liquid body is formed as plural zones in liquid-gas communication with one another.

10. In a method for separating organic solid waste materials from waste liquids while simultaneously restoring oxygen to said waste liquids to reduce the biological oxygen demand, the steps of forming a first aqueous liquid body as part of a closed circulatory system, supporting a mass of elongate strips of substantially individualized bark fibers in said liquid bodies so that at least a portion thereof extends above the surface of said liquid body, thereby forming liquid-gas contact zones within the confines of said mass of bark fibers, forming at least one additional aqueous liquid body as a separate part of said closed circulatory system, supporting an additional mass of elongate strips of substantially individualized bark fibers within the confines of said additional aqueous liquid body, thereby forming further liquid-gas contact zones within the confines of said additional mass of bark fibers, introducing a waste liquid containing unwanted organic solids to said first liquid body at a point above said liquid-gas contact zones, and continuously introducing an oxygen-containing gas to said closed circulatory system above the surface of said first acqueous liquid body to thereby create a slightly positive gas pressure within said closed circulatory system, said positive gas pressure cooperating with the introduction of said waste liquid to circulate the same through said respective liquid-gas contact zones, and continuously separating and removing organic solids collecting within the confines of said masses of bark fibers to permit renewed use of the same in separating unwanted organic solids.

11. A method as in claim 10 wherein said unwanted organic solids are continuously separated and removed from said fibers by micro-biological communities present within the confines of said masses of bark fibers, said micro-biological communities including aerobic microorganisms, invertebrates and water-dwelling vertebrates.

12. Apparatus for separating organic solids from waste liquids and simultaneously restoring oxygen to said liquids to reduce the biological oxygen demand, comprising: wall and conduit means forming a closed circulatory system, inlet means for introducing waste liquids to said closed circulatory system, wall means forming a chamber for a first body of liquid within said closed circulatory system, said chamber having means providing an airspace at the top, a plurality of elongated strips of generally fibrous material supported within said chamber and within said first body of liquid so that at least a portion thereof extends above the surface of said body of liquid, said fibrous material containing within its confines a micro-biological community capable of consuming organic waste materials, wall means forming a second chamber and having a second body of liquid generally below the level of the airspace in said first chamber, said second chamber likewise supporting a plurality of elongate strips of generally fibrous material together with a micro-biological community capable of consuming organic waste materials, and conduit means connecting said first and second chamber means in such fashion as to establish the liquid level in said first chamber means, means introducing an oxygen-containing gas to the airspace in said first chamber, and conduit means for discharging clarified liquid from said first and second chambers.

13. Apparatus as in claim 12 wherein said inlet means to the first chamber is connected to the outlet means of a conventional marine toilet.

14. Apparatus as in claim 12 wherein said closed circulatory system is entirely contained within the confines of a baffled cubical unit having external dimensions no greater than about 18 inches.

15. Apparatus as in claim 12 wherein said elongated strips of generally fibrous material comprise strips of substantially individualized bark fibers.

16. Apparatus as in claim 15 wherein said bark fibers are redwood bark fibers.

17. Apparatus as in claim 12 wherein said first chamber is subdivided by spaced vertical baffle means adapted to hold said fibrous material in a generally upright position, without interrupting the flow of gases and liquids above and below said baffle means.

18. Apparatus as in claim 12 wherein said second chamber and its contained fibrous material is arranged generally horizontally as respects said first chamber.

19 Apparatus as in claim 12 including wall means forming at least a third chamber for a third body of liquid extending above the level of liquid in said second chamber, said third chamber likewise supporting a plurality of elongate strips of generally fibrous material together with a microbiological community capable of consuming organic solid materials.

20. Apparatus as in claim 19 wherein said third chamber is subdivided by baffle means adapted to direct circulating gases upward through the same without restricting the flow of liquids therethrough.

21. A relatively compact apparatus for separating organic solids from waste liquids comprising: wall means forming a closed circulator system, means adjacent the top of said closed circulatory system for introducing waste liquids to the same, separate wall means forming a first chamber generally coextensive with the vertical dimensions of said closed circulatory system, means including a plurality of elongated strips of substantially individualized bark fiber vertically arranged in said first chamber in such fashion as to provide an airspace adjacent said inlet means, further wall means forming a second chamber extending horizontally adjacent a lower portion of said first chamber, a plurality of elongate strips of substantially individualized bark fiber in said second chamber, conduit means interconnecting said first and second chambers, additional wall means forming a third chamber adjacent said second chamber and extending above the level of said second chamber, said third chamber likewise containing a plurality of eloangate strips of bark fiber, conduit means interconnecting said second and third chambers, discharge means for clarified liquids communicating with said third chamber, and means introducing oxygen-containing gas under pressure to the airspace above said first chamber to cooperate with said entering waste liquids to percolate organic solids contained in said entering waste liquid into contact with micro-biological communities naturally contained within the bark fibers in said first, second and third chambers.

22. Apparatus as in claim 21 wherein said wall means forming said closed circulatory system enclose the further wall means forming said second chamber.

23. Apparatus as in claim 21 wherein the wall means forming said closed circulatory system enclose the additional wall means forming said third chamber.

24. Apparatus as in claim 21 wherein the wall means forming said first, second and third chambers are connected into a unitary compact structure.

25. Apparatus as in claim 21 wherein the wall means forming said first, second and third chambers are separately formed and independent of one another.

26. Apparatus for separating organic solids from waste liquids and simultaneously restoring oxygen to said liquids to reduce the biological oxygen demand, comprising wall and conduit means forming a chamber in a closed circulatory system, inlet means for introducing waste liquids to said closed circulatory system, internal wall means forming baffles for directing the waste liquids in a flow path about and through said internal wall means, said chamber having means providing an airspace at the top, a plurality of elongate strips of generally fibrous materials supported by said internal wall means so that a portion thereof extends upwardly into said airspace at the top of the chamber, said fibrous material containing within its confines a micro-biological community capable of consuming organic wastes, vent means in an upper wall of said chamber, said vent means having an external outlet capable of inducing a draft in said vent means, outlet means in the lower portion of said chamber, said outlet means having means to introduce an oxygen-containing gas to said closed circulatory system for movement about and through said baffle forming wall means to said vent means.

27. Apparatus as in claim 26 wherein said inlet means to said closed circuit system is connected to the outlet means of a conventional toilet.

28. Apparatus as in claim 26 wherein each of said wall means forming a baffle comprises an apertured member extending substantially horizontally within said chamber for a distance less than the internal horizontal dimension of said chamber.

29. Apparatus as in claim 26 wherein each of said wall means forming a baffle is provided with a plurality of apertures, the apertures of separate baffle forming wall means being aligned so as to receive and support therein the plurality of elongated strips of generally fibrous material.

References Cited
UNITED STATES PATENTS

| | | | |
|---|---|---|---|
| 3,238,124 | 3/1966 | Burton | 210—17 X |
| 3,192,154 | 6/1965 | Burton | 210—15 X |
| 3,407,935 | 10/1968 | Burton | 210—17 X |
| 3,219,577 | 11/1965 | Powers | 210—150 X |
| 3,235,234 | 2/1966 | Beaudoin | 210—17 X |

REUBEN FRIEDMAN, Primary Examiner

T. G. WYSE, Assistant Examiner

U.S. Cl. X.R.

210—150